May 24, 1927.
A. B. WILSON
1,630,154
CONTROLLING MECHANISM FOR HEADLIGHTS
Filed Nov. 26, 1926    2 Sheets-Sheet 1
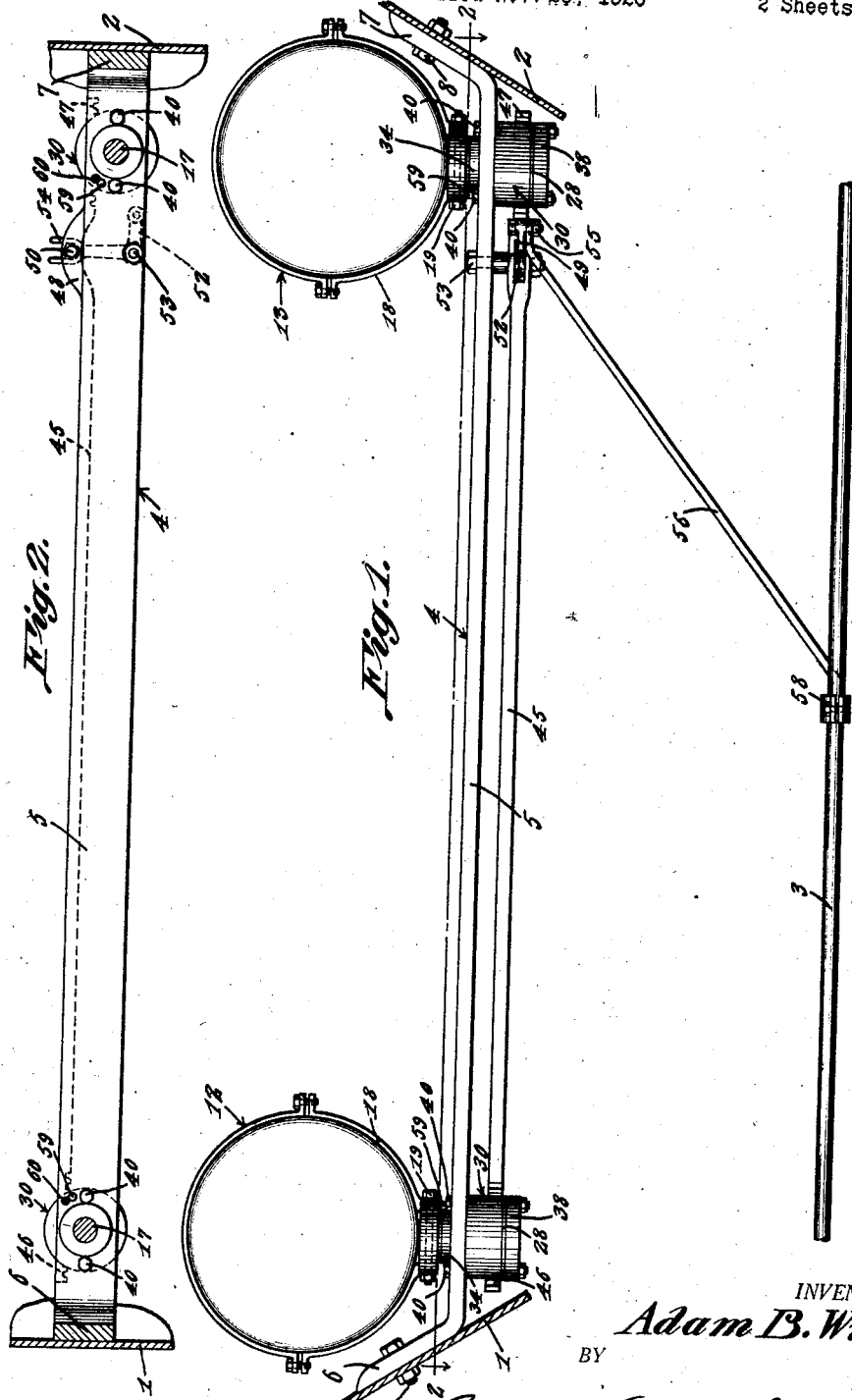
INVENTOR.
Adam B. Wilson,
BY
Geo. F. Kimmel   ATTORNEY.

May 24, 1927.
A. B. WILSON
1,630,154
CONTROLLING MECHANISM FOR HEADLIGHTS
Filed Nov. 26, 1926     2 Sheets-Sheet 2
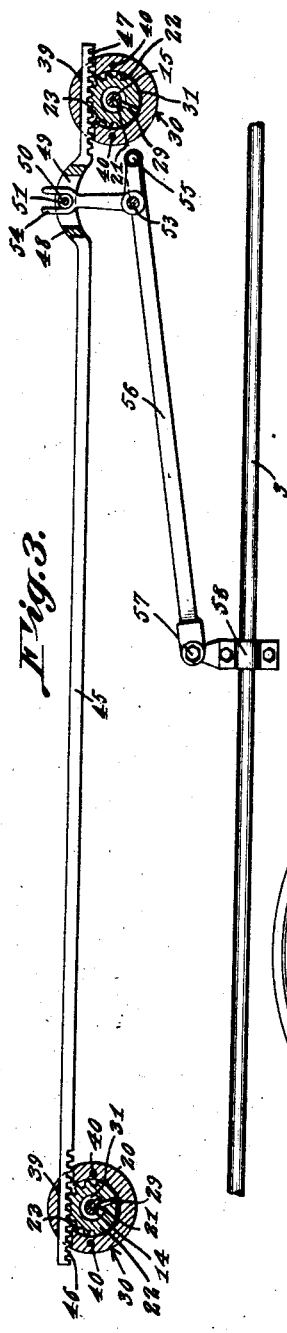
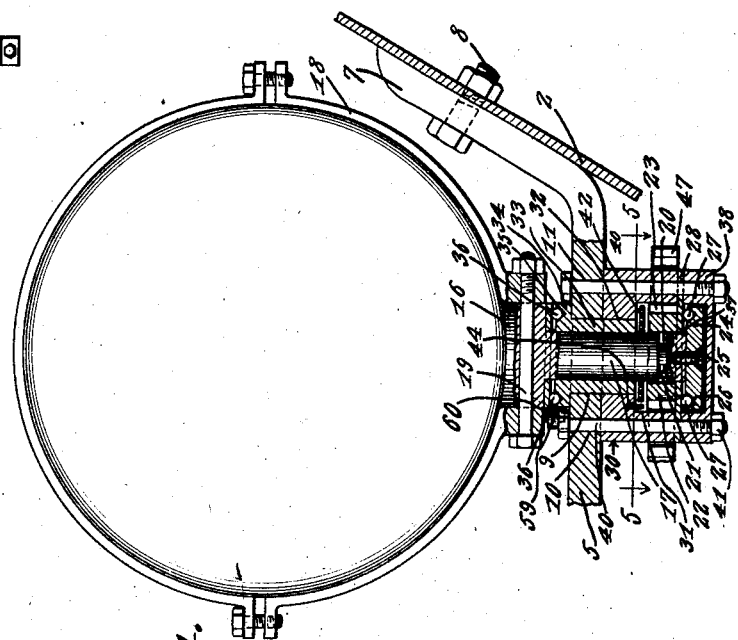
INVENTOR.
*Adam B. Wilson,*
BY
*Geo. P. Kimmel* ATTORNEY.

Patented May 24, 1927.

1,630,154

UNITED STATES PATENT OFFICE.

ADAM B. WILSON, OF PHILIPSBURG, PENNSYLVANIA.

CONTROLLING MECHANISM FOR HEADLIGHTS.

Application filed November 26, 1926. Serial No. 150,889.

This invention relates to a controlling mechanism for dirigible headlights of a motor vehicle and has for its object to provide, in a manner as hereinafter set forth, whereby the light rays are projected in a manner to enable a driver of the vehicle to see both sides of a road when turning corners.

A further object of the invention is to provide, in a manner as hereinafter set forth, a controlling mechanism for a dirigible headlight for a motor vehicle whereby when the vehicle is steered to the right, the right hand headlight is shifted to the right and the left hand headlight stays in its normal position, and when the vehicle turns to the left the left hand headlight turns to the left and the right hand headlight stays in its normal position, under such conditions one headlight will project its rays parallel to the vehicle on the outside of the road on the curve, and the other light will turn in the direction the vehicle is being steered projecting its light to the inside of the road on the curve, whereby both sides of the road can be seen by the driver when he turns corners.

Further objects of the invention are to provide, in a manner as hereinafter set forth, a controlling mechanism for the dirigible headlights of a motor vehicle, and which is simple in its construction and arrangement, strong, durable, operated from the steering mechanism of the vehicle, thoroughly efficient in its use, readily installed with respect to the vehicle, and comparatively inexpensive to set up.

With the foregoing and other objects in view, the invention consists of the novel construction, combination and arrangement of parts, as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a front elevation of a controlling mechanism, in accordance with this invention, for use in connection with the dirigible headlights of a motor vehicle and further illustrating the adaptation of the said controlling mechanism with respect to the headlights and the connecting rod of the steering mechanism of the vehicle.

Figure 2 is a section on line 2—2 Figure 1.

Figure 3 is a fragmentary view, in sectional plan.

Figure 4 is a fragmentary view in vertical section.

Figure 5 is a section on line 5—5 Figure 4.

Referring to the drawings in detail 1 and 2 denote the front fenders of a motor vehicle and 3 the connecting rod of a steering mechanism.

A controlling mechanism, in accordance with this invention, includes a support, referred to generally by the reference character 4, and which is disposed transversely with respect to the body of the vehicle and is fixedly secured to the fenders 1, 2 and arranged therebetween. The support 4 is constructed from a flat bar of appropriate width and comprises an intermediate portion 5 and a pair of upstanding outwardly inclined end portions 6, 7 which abut against the inner face of the fenders 1, 2 and fixedly secured therewith by holdfast devices 8. The intermediate portion 5 of the support 4, in proximity to each each end thereof, is provided with an opening 9. The support 5 is furthermore provided in proximity to each end thereof with a pair of openings 10, 11 and which are arranged at each side of and spaced a substantial distance from an opening 9. The openings 10 and 11 are of materially less diameter than the diameter of the opening 9.

The pair of headlights are referred to generally by the reference characters 12, 13 include posts 14, 15 respectively. Each of said posts is formed with a head 16 and a shank 17. The head 16 is of materially greater diameter than the shank 17 and the latter is disposed centrally with respect to the heads. The bracket 18 of each headlight is fixedly secured to the head 16 by the holdfast device 19 so that when the post is shifted the bracket 18 will be bodily carried therewith. The shank 17 in proximity to its lower end is formed with an annular groove 20 in which is arranged a radially disposed pin 21. Loosely mounted on the shank 17 and enclosing the groove 20, is a gear 22 provided with teeth 23, which extend but half the circumference of the body portion of the gear 22. Positioned against the lower end of the shank 17 is a disk 24, of greater diameter than the diameter of the shank 17. The disk 24 is fixedly secured against the lower end of the shank 17 by a holdfast device 25. The upper face of the disk 24 has a ball race 26 having positioned therein bearing balls 27, which ride against the lower face of a circular plate 28 of materially greater diameter than the diameter of the disk 24. The gear 22 is provided with a radially disposed stud 29, which extends into the groove 20 and coacts with the pin 21, for the purpose of coupling the shank 17 to the gear 22, whereby a post will be carried with a gear 22 when the latter is revolved.

Positioned against the lower face of the intermediate portion 5, of the support 4, at each end thereof, is a tubular member 30 formed of two different inner diameters. That part of the member 30 of largest inner diameter is indicated at 31 and that part of the member 30 of smallest inner diameter is indicated at 32. The inner diameter of the portion 32 is the same as the diameter of the opening 9 and the inner face of the portion 32 registers with the wall of the opening 9. Mounted in the opening 9 and the portion 32 of the member 30, is a bearing sleeve 33 provided in its upper end with an annular flange 34, which seats on the upper face of the intermediate portion 5 of the support 4. The upper face of the flange 34 is provided with a ball race 35 for the bearing balls 36 which ride against the lower face of the head 16 of a post. The circular plate 28 is positioned against the lower end of part 31 of the member 30, and is formed with an opening 37, for the passage of the shank 17. Positioned against the plate 28 is a cap member 38 and which encloses the disk 24. The part 31, of the member 30 at one side thereof is formed with a transversely extending opening 39. The plate 28, tubular member 30 and cap member 38 are secured together and to the intermediate portion 5 of the support 4, by a pair of vertically disposed bolts 40, which extend down through the openings 10 and 11 and also through the plate 28 and members 30 and 38, and carry on their lower ends clamping or securing nuts 41. The heads of the bolts are seated on the support 4. Arranged within the part 31 of the member 30, above the gear 22, and surrounding the shank 17, is a coiled controlling spring 42 for the post. One end of the spring 42 is connected as at 43 to the shank 17 and its other end is connected, as at 44 to the lower portion of the part 32 of the tubular member 30. The shifting of the post is had against the action of its controlling spring 42. The spring 42 automatically returns the post to its normal position. The pin 21 and stud 29 which associate with one headlight extends at an opposite inclination with respect to the pin 21 and stud 29 of the other headlight, and in this connection see Figure 3. This arrangement is had for the purpose of shifting one headlight in an opposite direction with respect to the direction in which the other headlight is shifted, that is to say if the left headlight is shifted to the left the right headlight will be shifted to the right and if the right headlight be shifted to the right the left headlight will be shifted to the left.

Common to the posts 14, 15, is a rack element for synchronously shifting the same and said rack element comprises a bar 45 provided at one end terminal of its forward side edge with a set of teeth 46, and at its other end terminal of the forward side edge thereof with a set of teeth 47. The bar 45 in proximity to the set of teeth 47, is formed with a rearwardly extended bow shaped portion 48, provided with a lengthwise slot 49, having extending transversely thereof a pin 50 provided with a roller 51. That end terminal of the bar 45, which is provided with the teeth 46, extends through the opening 49, formed in the tubular member 30 which associates with the post 14 and the other toothed end terminal of the bar 45 extends through the opening 39, formed in that tubular member 30 which associates with the post 15, see Figure 3. The toothed end terminal portions of the bar 45 mesh with the teeth 23 of the gears 22.

Associated with the rack element for the purpose of shifting it to provide for the synchronous shifting of the posts 14, 15 in opposite directions with respect to each other, is an actuating means therefor and which comprises a lever 52, pivotally suspended as at 53 from the intermediate portion 5 of the support 4. The lever 52 extends rearwardly with respect to the support 4 and is provided with a forked end 54 which straddles the roller 51 arranged in the slot 49 of the portion 48 of the bar 45. The forward end of the lever 52 is pivotally connected as at 55 to a shifting arm 56, which is pivotally connected as at 57, to a clamp 58 fixedly secured to the connecting rod 3 of the steering mechanism, whereby on the shift of the rod 3, the actuating means will shift the rack element and synchronously shift the headlights in opposite directions with respect to each other. Stops 59, 60 are provided to limit the shift of the headlights.

From the foregoing construction and arrangement of parts, it is obvious that when the actuating means be shifted in one direction, one of the headlights will be moved to the right and the other to the left under such conditions illuminating both sides of the road, and when the actuating means is shifted in the opposite direction one of the headlights will be moved to the left and the other to the right and both sides of the road will be illuminated. Therefore it is thought that the many advantages of a controlling mechanism for dirigible headlights, as hereinbefore set forth, can be readily understood, and although the prefered embodiment of the invention is as illustrated and described, yet it is to be understood that changes in the details of construction can be had which will fall within the scope of the invention as claimed.

What I claim is:

1. A controlling mechanism for a pair of dirigible headlights for motor vehicles, the combination with a pair of rotary headlight posts having their upper ends connected to the headlights, a gear loosely surrounding each of said posts, a reciprocatory rack element common to and engaging with said gears for rotating them, said posts and gears having coacting elements for detachably connecting the posts and gears together when the gears are revolved to provide for the rotating of the posts in such a manner that the headlight on that side towards which the vehicle is steered will be turned in the direction of steering while the other headlight is allowed to retain its normal or straightahead position, said coacting elements surrounded by said gears, and means connected directly to said rack element and operated from the steering mechanism of the vehicle for shifting such element.

2. A controlling mechanism for a pair of dirigible headlights for motor vehicles, the combination with a pair of rotary headlight posts having their upper ends connected to the headlights, a gear loosely surrounding each of said posts, a reciprocatory rack element common to and engaging with said gears for rotating them, said posts and gears having coacting elements for detachably connecting the posts and gears together when the gears are revolved to provide for the rotating of the posts in such a manner that the headlight on that side towards which the vehicle is steered will be turned in the direction of steering while the other headlight is allowed to retain its normal or straightahead position, said coacting elements surrounded by said gears, means connected directly to said rack element and operated from the steering mechanism of the vehicle for shifting such element, and a controlling spring for each post, said springs surrounding the post and positioned in proximity to its associated gear.

3. A controlling mechanism for a pair of dirigible headlights for motor vehicles the combination with a pair of rotary headlight posts connected at their upper ends to the headlights, a gear loosely surrounding each of said posts in proximity to the lower end thereof, a pair of stationary tubular housings each provided with a bearing for a post and further enclosing a gear, a controlling spring surrounding each post in proximity to a gear, having one end anchored to the post and its other end anchored to said housing, said posts and said gears having coacting elements for detachably connecting the posts and gears together when the gears are revolved to provide for the rotating of the posts in such a manner that the headlight on the side towards which the vehicle is steered will be turned in the direction of steering while the other headlight is allowed to retain its normal or straightahead position, a reciprocatory rack element common to said gears for revolving them, and means connected directly to the rack element and operated from the steering mechanism of the vehicle for shifting such element.

4. A controlling mechanism for a pair of dirigible headlights for motor vehicles the combination with a pair of rotary headlight posts connected at their upper ends to the headlights, a gear loosely surrounding each of said posts in proximity to the lower end thereof, a pair of stationary tubular housings each provided with a bearing for a post and further enclosing a gear, a controlling spring surrounding each post in proximity to a gear, having one end anchored to the post and its other end anchored to said housing, said posts and said gears having coacting elements for detachably connecting the posts and gears together when the gears are revolved to provide for the rotating of the posts in such a manner that the headlight on the side towards which the vehicle is steered will be turned in the direction of steering while the other headlight is allowed to retain its normal or straightahead position, a reciprocatory rack element common to said gears for revolving them, means connected directly to the rack element and operated from the steering mechanism of the vehicle for shifting such element, and bearing means for said posts, said means connected with the lower end of the posts, and means secured to said housings for enclosing said bearing means.

5. A controlling mechanism for a pair of dirigible headlights for motor vehicles, the combination with a pair of rotary headlight posts connected at their upper ends to the headlights, a bearing sleeve for each of said posts, bearing means carried by said sleeves for the headlights, stationary housings enclosing said sleeves and posts, a gear loosely surrounding each of said posts below a sleeve, a reciprocatory rack element common to said gears for revolving them, a controlling spring surrounding each post and interposed between a sleeve and a gear and anchored at one end to the post and at its other end to a housing, said posts and gears having coacting elements for detachably connecting the posts and gears together when the gears are revolved to provide for the rotating of the posts in such a manner that the headlight on that side towards which the vehicle is steered will be turned in the direction of steering when the other headlight is revolved to retain its normal or straightahead position, said coacting elements surrounded by said gears, and means connected directly to said rack element and operated from the steering mechanism of the vehicle for reciprocating the rack element to provide for the operation of the gears.

In testimony whereof, I affix my signature hereto.

ADAM B. WILSON.